Figure 2:
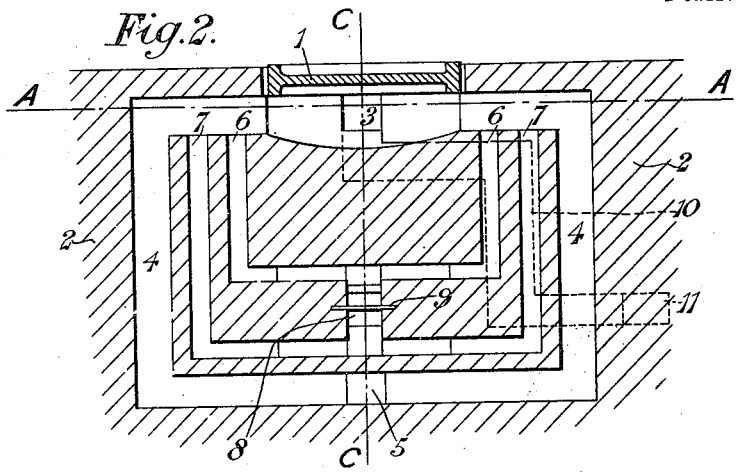

W. W. PILKINGTON, DEC'D.
S. L., R. A. & A. C. PILKINGTON, EXECUTORS.
GLASS FURNACE.
APPLICATION FILED MAR. 8, 1912.

1,154,052.

Patented Sept. 21, 1915.

Witnesses
L. C. Morrison
Albert Reisenberg

Inventor
William Windle Pilkington
per
Rogers, Kennedy & Campbell Attorneys.

UNITED STATES PATENT OFFICE.

WILLIAM WINDLE PILKINGTON, OF PRESCOT, ENGLAND; SARAH LOUISA PILKINGTON, RICHARD AUSTIN PILKINGTON, AND ALFRED CECIL PILKINGTON, EXECUTORS OF SAID WILLIAM WINDLE PILKINGTON, DECEASED, ASSIGNORS TO PILKINGTON BROTHERS, LIMITED, OF ST. HELENS, ENGLAND.

GLASS-FURNACE.

1,154,052.   Specification of Letters Patent.   Patented Sept. 21, 1915.

Application filed March 8, 1912.   Serial No. 682,372.

*To all whom it may concern:*

Be it known that I, WILLIAM WINDLE PILKINGTON, a subject of the King of the United Kingdom of Great Britain and Ireland, residing at "The Hazels," Prescot, in the county of Lancaster, England, have invented new and useful Improvements in or Relating to Glass-Furnaces, of which the following is a specification.

This invention relates to that kind of furnace which is used to keep hot the pots from which glass is drawn.

In the usual method of drawing glass in the form, for instance, of cylinders, a circular pot having a cavity on its upper and lower sides respectively is employed. This pot is mounted in a furnace in such a way that it can be turned over. A charge of molten glass is poured into the upper cavity of the pot, and from this molten mass a cylinder of glass is drawn in any well-known manner.

The function of the furnace is to keep the glass in the pot as nearly as possible at a uniform temperature during the operation of drawing glass.

With the arrangement just described, the flames of the furnace come into contact with the cavities of the pot or the glass in them, with the lower cavity directly, and with the upper cavity by leakage around the edges of the pot. Now, it has been found that with ordinary producer gas, such as is generally employed for heating furnaces of the above-named kind, dirt, consisting of tar, carbon and other impurities, is deposited in the cavities of the pot or on the glass, and has an injurious effect on the surface of the glass drawn. It has been found that the dirt ordinarily carried in suspension in the gas does not deposit on the pot, because it is burnt up in the furnace before reaching the pot. The dirt is however deposited in the passages leading to the furnace and, when the deposit becomes too thick, lumps of it become detached and are carried into the furnace. These lumps are too large to be completely burnt up before reaching the pot, and portions of them are deposited in the pot cavities. To avoid the deposition in the pot of the dirt reaching the furnace in this way, the deposit of dirt in the passages must either be removed before it becomes so thick as to be detached, or the deposition in the passages must be prevented.

This invention consists in improved means whereby the deposit of dirt in the passages is so much retarded that the furnace need be stopped for cleaning only at long intervals, or whereby such dirt as is deposited may be burnt away.

Figure 1:
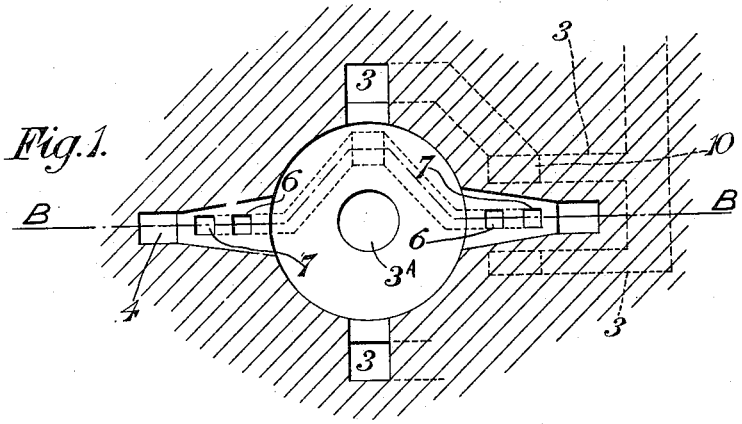
Figure 3:
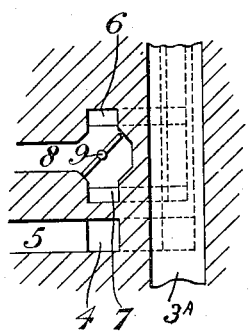

In the accompanying drawings, Figure 1 is a horizontal section of a furnace on the line A A of Fig. 2 showing in dotted lines the outlet passages. Fig. 2 is a vertical section on the line B B of Fig. 1. Fig. 2ª is a vertical section through the complete furnace on the line C C of Fig. 2, as viewed from the left-hand side of that figure. Fig. 3 is a vertical section along the line C C of Fig. 2 viewed from the left-hand side, showing only the inlet passages, and Fig. 4 is a view similar to Fig. 3 showing a modified form of the invention.

Referring to Figs. 1, 2 and 3 of the drawings, 1 (Fig. 2) is the pot; 2 is the brickwork of the furnace; 3, 3 are two outlet passages; 3ᴬ is the outlet for glass in the bottom of the furnace; 4, 4 are two air passages leading from the air supply conduit 5; 6, 7, 6, 7, are four gas passages leading from the gas supply conduit 8. The line B B is the center line of the horizontal portion of the gas passages 6, 7, 6, 7. As shown in the drawings all the passages, excepting the outlet passages, are duplicated, and the same reference figures are used to denote the two sets of passages: in the following description, reference will be made to one set only. Either of the two gas passages 6 and 7 can be connected to the gas supply conduit 8, by the valve 9. When this valve is in the position in which it is shown in the drawings, the passage 6 is connected to the supply conduit 8 while the passage 7 is shut off from any flow of gas. Now, it is found that, if the supply of gas is led to the furnace by the passages 6 and 7 alternately, one passage remaining idle while the other supplies gas, the amount of dirt which otherwise would be deposited in the gas passages is very much reduced, and that it is thereby necessary to clean out the passages only at rare intervals if at all. The vertical portions of each pair of passages 6 and 7, instead of being arranged one behind the other in the same longitudinal plane as in Figs. 1 and 2, may, if desired, be arranged one beside the other in the same transverse plane. The length of the intervals between successive operations of the valve 9, depends on the amount of dirt in the gas, and on other circumstances, and is best found by trial. In an experimental furnace, intervals of 15 to 30 minutes were found suitable. It is also found of advantage in preventing accumulations of dirt, to keep the gas passages as hot as possible, and, in order to do this, the outlet passages 3, 3, may be led close to the gas passages, so that the walls of these latter are heated by conduction through the intervening brickwork. Such an arrangement of the outlet passages is indicated in Figs. 1 and 2 in dotted lines, in connection with one set or pair of the gas passages 6, 7, the portions 10 of these outlet passages descending close to the gas passages 6 and 7 before connecting with the chimney conduit 11.

Figure 4:
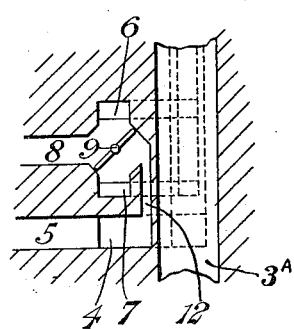
Figure 2A:
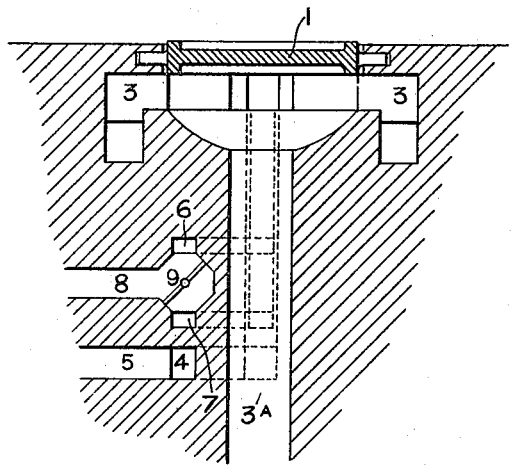

In the modified form of the invention shown in Fig. 4, a small passage 12 connects the air supply passage 5 with the chamber of the valve 9 in the gas supply passage. In the position of the valve shown in the drawing, air can flow from the passage 5 through the small passage 12 into the gas passage 7, which is idle. When the valve is reversed the air through 12 flows into the passage 6, which is then idle. This device therefore provides for the supply of a small quantity of air into whichever of the gas passages is idle. It is found that the introduction of this small quantity of air into the idle gas passage, has an important effect in removing the dirt, by causing it to burn. The passage 12 is restricted so that the quantity of air admitted into the gas passages, is not sufficient to reach the furnace, or at any rate to reach it in such quantity as to affect its working. The valve 9 is shown diagrammatically and without any means for operating it, because such valves are common in reversing furnaces and the construction of the valve forms no part of the invention.

The arrangement of furnaces, ports, passages, and valves may be widely modified without departing from the essence of the invention, and the furnace may have a single set of passages or any number of such sets, the essential feature of the invention being the alternate use of a pair of gas passages, each passage being in turn used to supply gas to the furnace while the other passage remains idle and may if desired have air introduced into it.

I claim:—

1. In a furnace for heating pots from which glass is drawn, the combination with a pair of gas passages adapted to supply gas to one inlet port of the furnace, a gas supply conduit capable of conducting gas to the said passages, and a single passage continuously supplying air to the said port of the furnace, of a valve adapted to connect one of the gas passages to the gas supply conduit and simultaneously therewith disconnect the other one therefrom so that it will remain idle, and vice versa.

2. In a furnace for heating pots from which glass is drawn, the combination with a pair of gas passages adapted to supply gas to the furnace, and a gas supply conduit capable of conducting gas to the said passages and a valve adapted to connect one of the gas passages to the gas supply conduit and simultaneously therewith disconnect the other one therefrom, and vice versa, of an air supply passage and a passage connected with the said air supply passage and adapted to supply a small quantity of air to the particular gas supply passage which for the time being is disconnected from the gas supply.

In witness whereof I have hereunto set my hand in the presence of two witnesses.

WILLIAM WINDLE PILKINGTON.

Witnesses:
JNO. DICKINSON,
BARTEN FLETCHER.

Copies of this patent may be obtained for five cents each, by addressing the "Commissioner of Patents, Washington, D. C."